(12) United States Patent  
de la Barré et al.

(10) Patent No.: US 8,633,972 B2  
(45) Date of Patent: Jan. 21, 2014

(54) METHOD FOR DISPLAYING IMAGE INFORMATION AND AUTOSTEREOSCOPIC SCREEN

(75) Inventors: René de la Barré, Mitweida (DE); Silvio Jurk, Crosta (DE)

(73) Assignee: Fraunhofer-Geselschaft zur Foerderung der angewandten Forschung e.V., Munich (DE)

( * ) Notice: Subject to any disclaimer, the term of this patent is extended or adjusted under 35 U.S.C. 154(b) by 287 days.

(21) Appl. No.: 13/037,911

(22) Filed: Mar. 1, 2011

(65) Prior Publication Data

US 2011/0216061 A1 Sep. 8, 2011

Related U.S. Application Data

(60) Provisional application No. 61/310,079, filed on Mar. 3, 2010.

(51) Int. Cl.
*H04N 13/04* (2006.01)

(52) U.S. Cl.
USPC ............ 348/51; 348/42; 348/E13.075; 353/7; 345/419

(58) Field of Classification Search
None
See application file for complete search history.

(56) References Cited

U.S. PATENT DOCUMENTS

| | | |
|---|---|---|
| 5,822,117 A | 10/1998 | Kleinberger et al. |
| 6,195,069 B1 | 2/2001 | Rhoads |
| 6,307,585 B1 | 10/2001 | Hentschke |
| 6,603,504 B1 | 8/2003 | Son et al. |
| 6,791,570 B1 | 9/2004 | Schwerdtner et al. |
| 7,697,750 B2 | 4/2010 | Simmons |
| 2006/0132916 A1 | 6/2006 | Oikawa et al. |
| 2006/0170764 A1 | 8/2006 | Hentschke |
| 2006/0215018 A1* | 9/2006 | Fukushima et al. ............ 348/51 |
| 2008/0007559 A1 | 1/2008 | Kalaiah et al. |
| 2008/0024598 A1 | 1/2008 | Perlin et al. |
| 2008/0055547 A1* | 3/2008 | Saishu et al. ...................... 353/7 |

(Continued)

FOREIGN PATENT DOCUMENTS

| | | |
|---|---|---|
| DE | 10043305 A1 | 3/2002 |
| DE | 102006031799 B3 | 1/2008 |

(Continued)

OTHER PUBLICATIONS

International Search Report issued in PCT/EP2010/007441, mailed Mar. 16, 2011, 3 pages.

*Primary Examiner* — Christopher S Kelley
*Assistant Examiner* — Kaitlin A Retallick

(57) ABSTRACT

A method for displaying image information on an autostereoscopic screen that is suitable for simultaneous display of a plurality of views visible respectively from at least one of a plurality of laterally offset viewing zones. A first stereoscopic half-image and a second stereoscopic half-image, which are perceptible simultaneously and together produce a stereoimage, are reproduced on the screen such that the first stereoscopic half-image is visible from two laterally offset and respectively continuous regions, while the second stereoscopic half-image is visible from a stereozone which is situated between the two mentioned regions and is smaller than each of these two regions.

14 Claims, 6 Drawing Sheets

(56) References Cited

U.S. PATENT DOCUMENTS

| | | |
|---|---|---|
| 2008/0117231 A1 | 5/2008 | Kimpe |
| 2008/0117233 A1* | 5/2008 | Mather et al. ................. 345/690 |
| 2009/0123030 A1 | 5/2009 | De La Barre et al. |
| 2009/0278936 A1 | 11/2009 | Pastoor et al. |
| 2010/0295928 A1 | 11/2010 | De La Barre et al. |
| 2011/0128356 A1 | 6/2011 | de la Barre et al. |
| 2011/0216171 A1 | 9/2011 | De La Barre et al. |
| 2011/0310092 A1 | 12/2011 | de la Barre |

FOREIGN PATENT DOCUMENTS

| | | |
|---|---|---|
| EP | 0877966 B1 | 11/1998 |
| EP | 1689162 A2 | 8/2006 |
| WO | WO9821620 A1 | 5/1998 |
| WO | WO2009095862 A1 | 8/2009 |

* cited by examiner

METHOD FOR DISPLAYING IMAGE INFORMATION AND AUTOSTEREOSCOPIC SCREEN

RELATED APPLICATION

This application claims the benefit under 35 U.S.C. §119 of U.S. Provisional Application Ser. No. 61/310,079 filed Mar. 3, 2010 entitled "METHOD FOR DISPLAYING IMAGE INFORMATION AND AUTOSTEREOSCOPIC SCREEN," which application is incorporated by reference herein in its entirety.

TECHNICAL FIELD

The invention relates to a method for displaying image information on an autostereoscopic screen as well as to an autostereoscopic screen.

BACKGROUND

Screens such as autostereoscopic displays are known as multiuser displays or multiperson screens on which, in a conventional mode of operation, a plurality of more than two complementary stereoscopic half-images may be reproduced such that a plurality of persons can perceive a reproduced scene three-dimensionally. In addition to a matrix screen having a large number of subpixels, generic screens may include a beam splitter grid that is suitable for directing light emanating from the subpixels respectively into at least one of the viewing zones. They thereby differ from so-called single view displays that are suitable for reproducing only two stereoscopic half-images and on which only one single viewer can see stereoimages of satisfactory quality, while a further person who is laterally offset relative to this viewer cannot even detect a monoimage.

The operation of multiperson screen firstly presupposes however that image information of a corresponding number of views is present. These must be recorded either by a corresponding number of cameras that are laterally offset, which entails high technical complexity and in particular the necessity for unmanageable camera systems or, in a likewise complex manner, may be determined by computer from the image information of only two stereoscopic half-images. Only a very restricted reproduction quality can be achieved because of disruptive cross-talk of adjacent image channels and because the persons viewing the screen see two half-images accurately only in specific positions which fit together correctly to form a stereoimage. However, since a viewer typically moves at least slightly, the stereoimage can therefore be viewed with satisfactory comfort by none of the mentioned persons.

SUMMARY

The invention pertains to a method for displaying autostereoscopically perceptible stereoimages in which, in addition to a viewer who is intended to be able to perceive the stereoimages comfortably and with satisfactory quality three-dimensionally, at least one further viewer can likewise perceive as comfortably as possible and with as good quality as possible image contents of these stereoimages at least as two-dimensional images (i.e. as monoimages). Furthermore, the invention pertains to a corresponding screen with which image information of stereoimages can be reproduced in a manner satisfying these requirements.

In the proposed method, a first stereoscopic half-image and a second stereoscopic half-image, which are perceptible simultaneously and together produce a stereoimage, are reproduced on a screen such that the first stereoscopic half-image is visible from two laterally offset and respectively continuous regions, while the second stereoscopic half-image is visible from a stereozone that is situated between the two mentioned regions and is smaller than each of these two regions.

As a result, a first viewer sees a stereoimage of high quality if a head position of this viewer is chosen such that one eye comes to be situated in one of the two mentioned regions from which the first stereoscopic half-image is visible and the viewer's other eye comes to be situated in the mentioned stereozone. In addition, at least one second viewer of the screen can likewise comfortably perceive image contents of this stereoimage at least as a two-dimensional image or monoimage—corresponding to one of the two half-images—as long as the second viewer remains with both eyes in one of the two mentioned and comparatively large regions next to the smaller stereozone. The second viewer can thereby move freely within comparatively wide limits next to the first viewer without losing the monoimage. Hence for example, the possibility is opened up that the first viewer can show one or more further viewers something on the screen on which the first viewer has been shown the image information three-dimensionally. Advantageously, a conventional multiperson screen can thereby be used to implement the method in that adapted software is used for activation of the method. Compared with other possible ways of reading in the image information of two complementary stereoscopic half-images into such a screen, as large a region as possible can be covered in the described manner, in which in fact no autostereoscopic viewing is possible, but image contents of the stereoimage are detectable at least as a monoimage of good quality. This is due to the fact that the stereozone can be very small because it requires space only for one eye of the first viewer.

As used herein, the term "stereozone" may deviate somewhat from other uses of this term. As used herein, the term "stereozone" describes a zone in which one of two stereoscopic half-images (termed second half-image here) is visible so that a viewer can see stereoimages if one of two eyes of this viewer is situated within this zone.

If the screen is designed as a matrix screen with a beam splitter grid, the method can be achieved particularly easily in that image points of the first stereoscopic half-image are reproduced respectively on a larger number of subpixels of the matrix screen than image points of the second stereoscopic half-image. As matrix screen, also those image screens with subpixels distributed over an area are thereby described, in which screens the subpixels are not disposed in lines and columns standing vertically one above the other, but rather form a different pattern. The subpixels need not necessarily be assigned to different colours.

The autostereoscopic screen described herein, which makes it possible to reproduce image information in the described advantageous manner, includes a control unit for activating the subpixels of the matrix screen as a function of image information of a first stereoscopic half-image and of a second stereoscopic half-image which is designed by programming technology to apportion the image information of the two stereoscopic half-images at least in one possible operating mode to the subpixels such that image points of the first stereoscopic half-image are reproduced respectively on a larger number of subpixels than image points of the second stereoscopic half-image so that the first stereoscopic half-image is visible from two laterally offset and respectively continuous regions, while the second stereoscopic half-image is visible from one stereozone which is situated between the two mentioned regions and is smaller than each of these two regions.

In some embodiments, the matrix screen of the autostereoscopic screen may be a liquid crystal screen, i.e. an LCD display. In some embodiments, an OLED (organic light emitting diode) screen may be used. The beam splitter grid may be configured in a manner known per se as slot or strip grid or as cylinder lens grid in order to fulfil the desired function. Other possibilities are stepped grids, perforated grids or spherical lens grids.

An embodiment of the method provides that, in each of a large number of lines of the matrix screen, respectively groups of adjacent subpixels which are activated in order to reproduce one of the image points of the first stereoscopic half-image alternate with directly adjacent subpixels or those separated therefrom by at least one blanked subpixel or with smaller groups of adjacent subpixels that are activated respectively in order to reproduce one of the image points of the second stereoscopic half-image. Correspondingly, the control unit of the image screen can be designed to activate the matrix screen at least in the mentioned operating mode such that, in each of a large number of lines of the matrix screen, respectively groups of adjacent subpixels that reproduce respectively one of the image points of the first stereoscopic half-image alternate with directly adjacent subpixels or those separated therefrom by at least one blanked subpixel or with smaller groups of adjacent subpixels which reproduce respectively one of the image points of the second stereoscopic half-image.

Conventional multiperson screens are normally designed for viewing from a relatively large distance (nominal viewing distance). In order to enable viewing by the first viewer and possibly at least one second viewer from a smaller distance which is more comfortable for this, the image information of the two half-images can be written into the subpixels of the matrix screen, spread in the lateral direction, such that the two regions from which the first stereoscopic half-image is completely visible, and the stereozone from which the second half-image is completely visible have a maximum width in a viewing plane that is situated closer to the screen than a plane at a spacing from the screen by the nominal viewing distance, from which plane the plurality of more than two views is visible when the screen is operated as multiperson screen. A lateral spacing between the stereozone and at least one of the two mentioned regions in the viewing plane is thereby intended at any rate to be smaller than an average eye spacing, i.e. significantly less than 65 mm, so that the stereoimage can be perceived by the first viewer. Of course this applies also to other embodiments in which the spacing between the viewing plane and the screen corresponds to the nominal viewing distance.

For the same purpose, the control unit of the proposed screen can be designed by corresponding programming to write in the image information of the two half-images in the mentioned operating mode into the subpixels of the matrix screen, spread in lateral direction, such that the two regions from which the first stereoscopic half-image is completely visible, and the stereozone from which the second half-image is completely visible, have their maximum width in the viewing plane which is situated closer to the screen than the plane from which, in another operating mode in which the screen forms a multiperson screen, the plurality of more than two views is visible. In some embodiments of such autostereoscopic screens, the matrix screen can thereby be activated in the mentioned other operating mode such that the subpixels are apportioned in each line cyclically to a number of image channels corresponding to the number of more than two views, while the subpixels in the first-mentioned operating mode are apportioned to the two half-images such that an average spacing between area centre points of the adjacent image points of the first half-image, formed respectively from a plurality of subpixels, and an average spacing between area centre points of the adjacent image points of the second half-image, formed likewise respectively from a plurality of subpixels, deviate respectively from an integral multiple of a spacing between adjacent subpixels of the matrix screen.

In order that the first viewer see the stereoimage without disruption even when moving within relatively wide limits, a head position and/or head movement of the first viewer may optionally be detected and activation of the screen can be adjusted or changed as a function of the detected head position or movement such that the stereozone from which the second stereoscopic half-image is visible and the two regions which are situated next to this stereozone and from which the first stereoscopic half-image is visible can be placed or tracked such that a first eye of the viewer comes to be situated or remains in one of the two mentioned regions and a second eye of the viewer comes to be situated or remains in the mentioned stereozone. For this purpose the previously mentioned groups of subpixels can be displaced laterally, which can be effected consequently finely stepped or quasi continuously, such that an intensity with which a subpixel situated at the edge of a group is activated is reduced, and a previously blanked subpixel or one activated with lower intensity at an oppositely situated edge of the same group of subpixels is activated with correspondingly higher intensity, i.e. brighter. There is thereby meant by displacement respectively a displacement of intensity centre points of the groups of subpixels and/or displacement of edges of these groups. Also individual subpixels or image channels of the screen which were assigned initially to one of the two half-images can thereby be assigned to the other half-image.

In some embodiments, spreading in the lateral direction can be effected in a corresponding manner, redistribution of the various image channels to the two half-images being effected in each line of the screen respectively quasi continuously from one to the other end of the line, the prerequisite being that the subpixels of one line are apportioned in a cyclical sequence to the image channels which correspond to the various views during an operation of the screen as multiperson screen.

In some embodiments, the movement of at least one second viewer is detected and activation of the screen is changed as a function of the detected movement such that the image information of the two stereoscopic half-images is transposed and, at the same time, the stereozone and the two mentioned regions are displaced laterally by about an eye spacing if an eye of the second viewer is consequently prevented from leaving one of the two mentioned regions. For this purpose, the stereozone and the two mentioned regions are displaced such that the first viewer again has one eye in the mentioned stereozone and one eye in one of the mentioned regions, first and second eye now being transposed relative to that discussed previously in that the right eye of the first viewer comes to be situated in the stereozone when the stereozone previously covered the left eye of the first viewer, or vice versa. Thus a freedom of movement of the at least one second viewer, i.e. a region within which the second viewer can move freely without losing the monoimage, can be further increased. There is thereby intended by transposing the half-images that the first stereoscopic half-image is now a right half-image and the second stereoscopic half-image is now a left half-image when previously the first stereoscopic half-image was the left half-image and the second stereoscopic half-image was the right half-image or vice versa. As a result, in some cases the first viewer cannot perceive the change and still sees the correct stereoimage while at least one second viewer could in fact theoretically perceive a jump between the two half-images which the second viewer can see as monoimage but will not experience this almost imperceptible jump as disturbing.

An embodiment of the screen has a device for detecting a head position of at least of the first viewer, the control unit being designed to activate the matrix screen as a function of the detected head position such that the stereozone from which the second stereoscopic half-image is visible and the two regions which are situated next to this stereozone and from which the first stereoscopic half-image is visible are placed or tracked, during a change of head position, such that the first eye of the viewer is situated or remains in one of the two mentioned regions while the second eye of the viewer is situated or remains in the mentioned stereozone. Devices of this type are known per se in conjunction with so-called tracking methods and can be produced for example by one or two video cameras with image recognition programs. Furthermore, the device can thereby be suitable for detecting a head position of at least one second viewer, the control unit then being designed furthermore to change the activation of the matrix screen as a function of a change in the detected head position of the second viewer such that the image information of the two stereoscopic half-images are transposed and, at the same time, the stereozone and the two mentioned regions are displaced laterally by an eye spacing if an eye of the second viewer is consequently prevented from leaving one of the two mentioned regions.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Embodiments of the invention are explained subsequently with reference to FIGS. 1 to 7.

DETAILED DESCRIPTION

Figure 1:
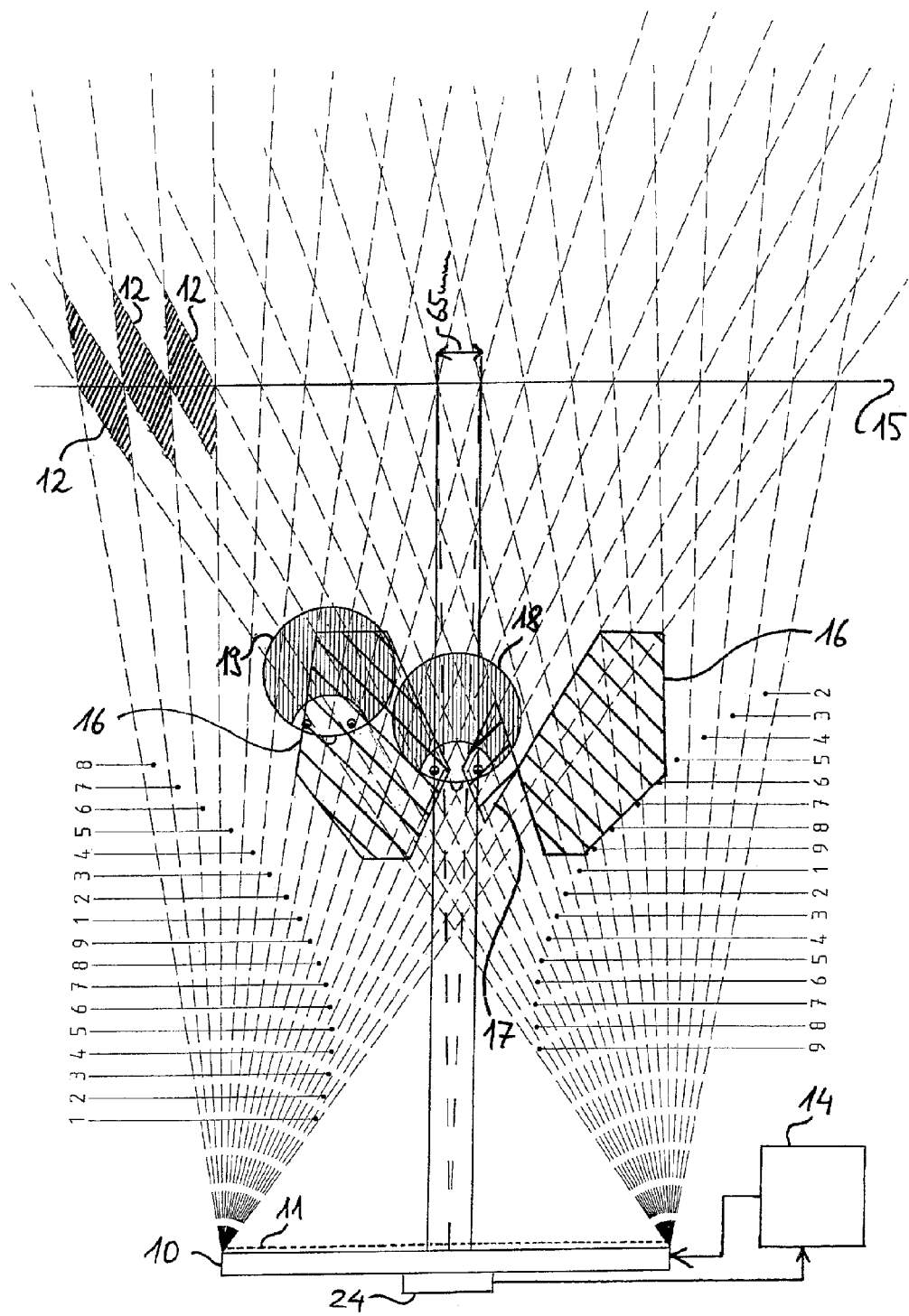
FIG. 1 provides a schematic representation of a view on an autostereoscopic screen on which image information is displayed for two different viewers.
Figure 3:
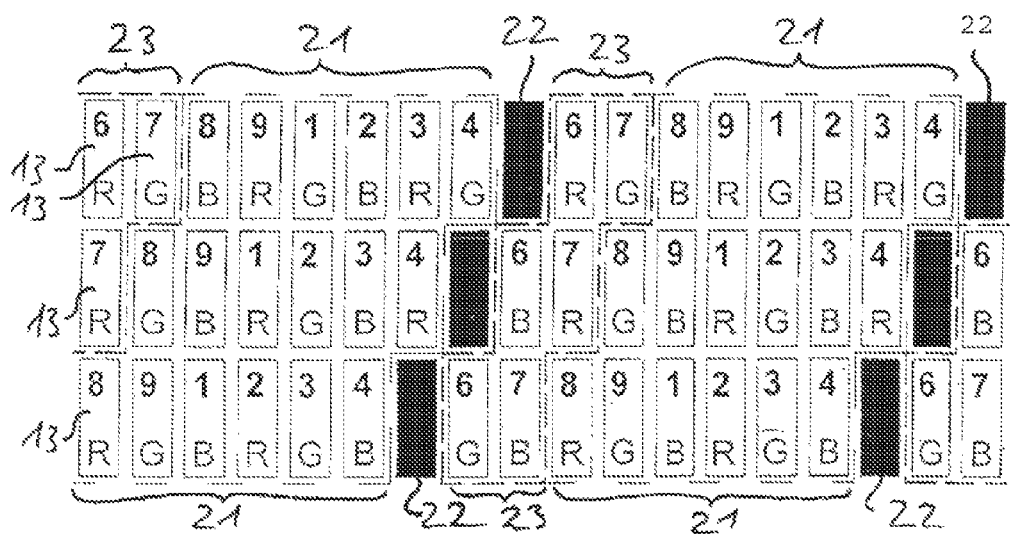
FIG. 3 provides a view of a section of a pixel plane of the screen of FIG. 1.

In FIG. 1, an embodiment of an autostereoscopic screen is illustrated, the screen having a matrix screen 10 with a large number of subpixels and a beam splitter grid 11 which is disposed in front of the matrix screen 10 and is suitable for directing light emanating from the subpixels of the matrix screen 10 respectively into various zones of a large number of laterally offset viewing zones 12. Beam splitter grids 11 of this type can also be termed barrier grids. The matrix screen 10 may be a liquid crystal screen, a section of a pixel plane of which is shown in FIG. 3 and the subpixels 13 of which are apportioned to a large number of lines, red, green and blue subpixels 13 alternating in each line in a cyclical sequence (characterized in FIG. 3 by the capital letters R, G and B). The beam splitter grid 11 can be designed as slot grid or as cylinder lens grid, slots or cylinder lenses of the beam splitter grid 11 being inclined by about 20 degrees from a vertical line. Finally, the screen has a control unit 14 which is designed by programming technology to activate the matrix screen 10 and can activate the subpixels 13 of the matrix screen 10 as a function of image information of various stereoscopic half-images.

In one operating mode, the screen can be operated as a multiperson screen in that image information from nine different stereoscopic half-images are reproduced on the subpixels 13 of the matrix screen 10 in a cyclical sequence so that respectively one of these stereoscopic half-images is visible from each of the laterally offset viewing zones 12. In a plane 15 in which the viewing zones 12 have a maximum width, several persons can then perceive stereoimages autostereoscopically at the same time if the nine stereoscopic half-images are chosen suitably in a complementary manner relative to each other.

In another method for displaying image information on the autostereoscopic screen, a first stereoscopic half-image and a second stereoscopic half-image that are simultaneously perceptible and together produce a stereoimage are reproduced on the screen, the control unit 14 being designed by programming technology such that the image information of these two stereoscopic half-images is apportioned to the subpixels 13 such that image points of the first stereoscopic half-image respectively are reproduced on a larger number of subpixels 13 than image points of the second stereoscopic half-image, and in fact such that the first stereoscopic half-image is visible from two laterally offset and respectively continuous regions 16, whilst the second stereoscopic half-image is visible from a stereozone 17 which is situated between the two mentioned regions 16 and is smaller than each of these two regions 16. The control unit 14 can thereby be designed such that the screen can be operated in a first operating mode in the manner just described, while it can be operated in a second operating mode in the previously sketched manner as a multiperson screen.

One of the two regions 16 that can be detected in FIG. 1 concerns an adjacent lens zone from which the same image points are visible as from the other region 16 and can be seen respectively through adjacent slots or lenses of the beam splitter grid 11. In addition, there can of course be further zones which are offset even further laterally and from which again the first half-image can be seen as from the regions 16—just as there can be beyond the regions 16 again additional zones—namely adjacent lens zones to the stereozone 17—from which the second half-image can be detected. As described herein, an embodiment in which two regions and one stereozone situated therebetween should therefore not preclude additionally further zones of a corresponding property being present.

There can be seen in FIG. 1 a first viewer 18 and a second viewer 19, a head position of the first viewer 18 being chosen such that a right eye of this viewer 18 is situated in one of the regions 16 and a left eye of the viewer 18 in the stereozone 17. As a result of the fact that the first half-image which can be detected from the regions 16 is chosen as right half-image, and the second half-image which can be detected from the stereozone 17 is chosen as left half-image, the first viewer 18 can perceive autostereoscopically the stereoimage composed of the two stereoscopic half-images. The second viewer 19 does not see a stereoimage but can perceive the image information of one of the two half-images, in the present case of the right half-image, as two-dimensional image because both a left eye and a right eye of the second viewer 19 is situated within one of the regions 16. As a result of the fact that the stereozone 17 is chosen merely to be precisely so large that the first viewer 18 can detect the left half-image with his left eye, the regions 16 from which at least one monoimage of good quality can be detected together cover a surface area which is as large as possible.

Figure 2:
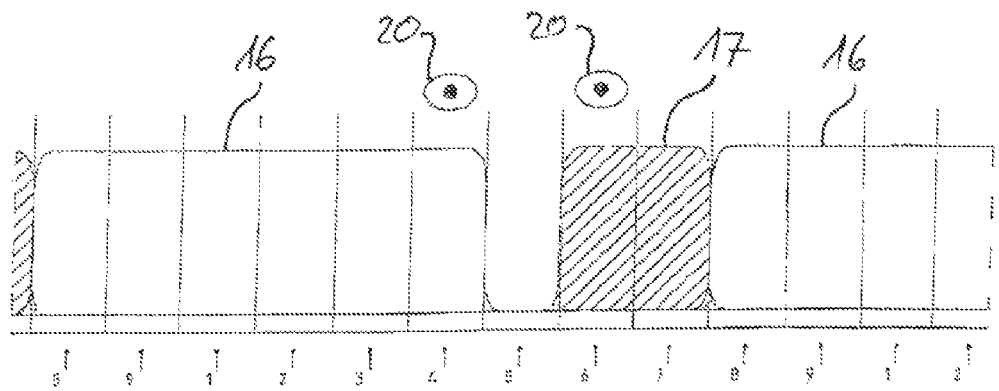
FIG. 2 provides a schematic representation of how image information of two different stereoscopic half-images is reproduced with the screen of FIG. 1 such that one of the mentioned viewers can see a stereoimage.

In FIG. 2, it is illustrated in diagrammatic form how the two eyes 20 of the first viewer 18 come to be situated in one of the two regions 16 or in the stereozone 17. There as also in FIGS. 1 and 3, nine image channels 1-9 of the screen are characterized, which image channels correspond during operation of the screen as multiperson screen to the nine different stereoscopic half-images or views. It can be seen in FIG. 3 how these nine image channels are formed by the different subpixels 13 of the matrix screen 10. Each image point thereby extends over three lines in order that, in the same number, red, green and blue subpixels 13 are available for displaying each image point. FIGS. 1-3 also illustrate how the subpixels 13 are activated in the operating mode described here in order to apportion the two half-images to the regions 16 and the stereozone 17. For this purpose, in each line of the matrix screen 10 respectively, groups 21 of adjacent subpixels 13 which respectively reproduce one of the image points of the first stereoscopic half-image alternate with directly adjacent or smaller groups 23 of adjacent subpixels which are separated therefrom by at least one blanked subpixel 22, which reproduce respectively one of the image points of the second stereoscopic half-image. The groups 21 which extend like the groups 23 respectively over 3 lines of the matrix screen 10 thereby comprise respectively six subpixels 13 in the illustrated section in each of the lines, while the smaller groups 23 have only two subpixels 13 here in each line. This is produced here in that the image channels 1-4 and 8 and 9 are occupied by the image information of the first stereoscopic half-image, whilst the image channel 5 is blanked and the image channels 6 and 7 are occupied by the image information of the second stereoscopic half-image.

In some embodiments, the screen is activated only within one partial region in the described manner, while, outwith this partial region, only image information of a monoimage is written in, each image point of which could then fill nine subpixels per line. Then the first viewer could perceive a stereoimage only in the partial region. Otherwise, the first viewer would only see a monoimage.

Figure 4:
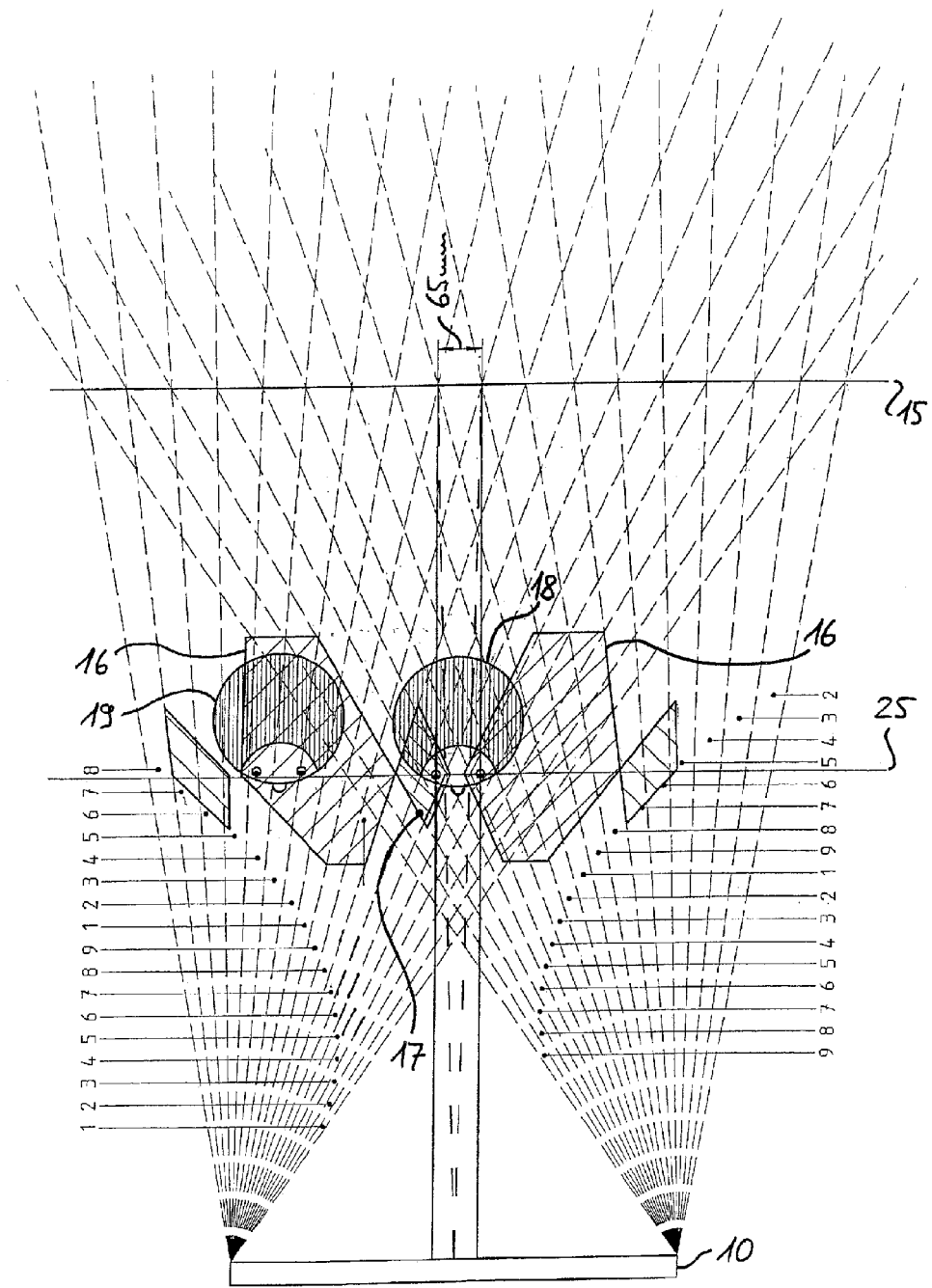
FIG. 4 provides in a representation corresponding to FIG. 1, the same screen which is activated in a changed way after a movement of one of the two viewers, FIG. 5 provides in a corresponding representation, once again the same screen, it being illustrated here within what limits this viewer can move freely.

The described screen also has a device 24, illustrated only schematically in FIG. 1, for detecting the head position of the first viewer 18 and a head position of the second viewer 19. This device 24 can be produced for example by two video cameras with a corresponding image recognition program. With the device 24, in particular the movement of the second viewer 19 is now detected and the activation of the matrix screen 10 is changed by the control unit 14 as a function of the detected movement such that the image information of the two stereoscopic half-images are transposed and, at the same time, the stereozone 17 and the two regions 16 are displaced laterally by an eye spacing of approx. 65 mm if an eye of the second viewer 19 is consequently prevented from leaving one of the two regions 16. This is illustrated by FIG. 4 which corresponds extensively to FIG. 1, but shows a situation in which the head position of the second viewer 19 has changed relative to the situation of FIG. 1 such that, with unaltered activation of the matrix screen 10, the second viewer 19 could no longer see completely the two-dimensional image provided by the first stereoscopic half-image with both eyes. By means of the activation of the matrix screen 10 altered in the just described manner, the two regions 16 are now however displaced such that both eyes of the second viewer 19 are still always situated in one of the two regions 16 so that the second viewer 19 can still always see a monoimage which, because of transposing the first and the second stereoscopic half-image, now however concerns the left half-image. The regions 16 and the stereozone 17 are thereby displaced precisely such that the first viewer 18 again has one eye in the stereozone 17 and the other eye in one of the regions 16. However, the right eye of the first viewer 18 is now situated in the stereozone 17 and the left eye of this viewer 18 in one of the regions 16, while previously, i.e. in the situation shown in FIG. 1, the left eye of the viewer 18 was situated in the stereozone 17 and the right eye in the other region 16. By transposing the two half-images, the first viewer 18 still however sees the same correctly reproduced stereoimage. The altered activation of the matrix screen is distinguished in the represented case in that, for the image points shown by way of example in FIGS. 1 and 4, the image channels 1-4 and 8 and 9 now reproduce the first stereoscopic half-image which now concerns the left half-image while the image channel 5 is still blanked and the image channels 6 and 7 reproduce the second stereoscopic half-image which now concerns the right half-image.

Figure 5:
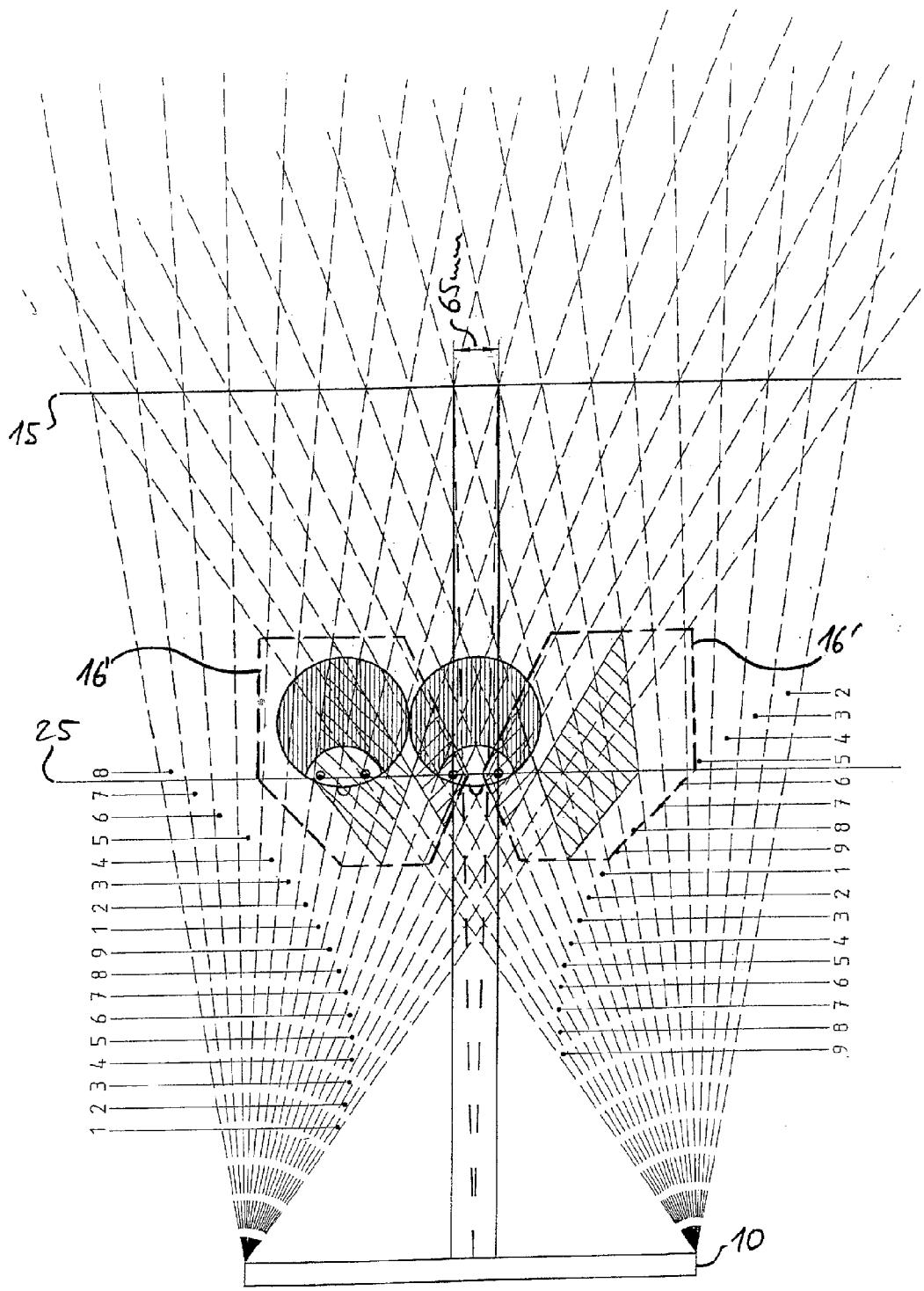

In FIG. 5, in which recurring features are provided with the same reference numbers, two regions 16' edged by broken lines are shown, in the relatively wide limits of which the second viewer 19 can move freely because of the described measures without losing the monoimage from view, which can jump in a barely perceptible manner between the right and left half-image when the viewer 19 moves such that the activation of the matrix screen 10 must be changed in the described manner.

Figure 6:
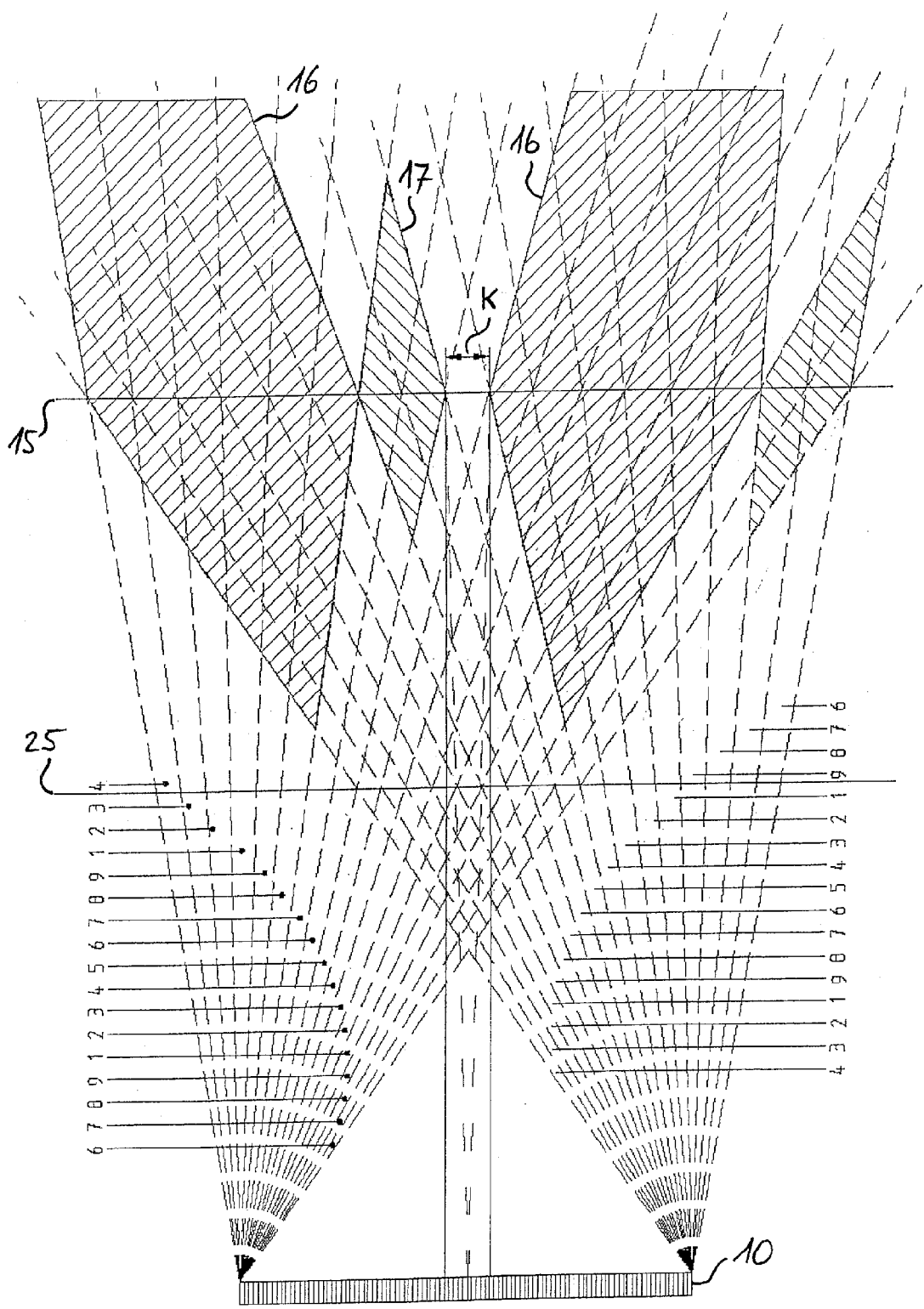
FIG. 6 provides again in a corresponding representation, the same screen in a differently activated state in which the displayed image information can be perceived without error only from a greater distance.

In the described representation of the two stereoscopic half-images on the screen, the image information of the two half-images is written in by the control unit 14 into the matrix screen 10, spread in the lateral direction, and apportioned there to the subpixels 13 such that the two regions 16 and the stereozone 17 respectively have a maximum width in a viewing plane 25 which is situated closer to the screen than the plane 15 which is at a spacing from the screen by a nominal viewing distance and from which the stereoimages can be perceived when the screen is operated in a conventional manner as multiperson screen. As opposed to the operating mode in which the screen acts and is activated as multiperson screen such that the subpixels 13 are apportioned in each line cyclically to the image channels 9 and each of these image channels 1 to 9 corresponds precisely to one of nine different views, the subpixels 13 are apportioned, in the operating mode described here, to the two half-images such that an average spacing between area centre points of the adjacent image points of the first half-image formed respectively from a plurality of subpixels (corresponding to the groups 21 of FIG. 3) and an average spacing between area center points of the adjacent image points of the second half-image formed likewise respectively from a plurality of subpixels 13 (corresponding to the groups 23 of FIG. 3) deviate respectively slightly from an integral multiple of a spacing between adjacent subpixels 13. In the embodiment described here, the mentioned average or averaged spacing is slightly more than a multiple of nine of the spacing of adjacent subpixels 13. It is illustrated in FIG. 6 where the two regions 16 and the stereozone 17 come to be situated when the image information is not spread in the described manner. Then both the regions 16 and the stereozone 17 have their maximal width in the plane 15 in which the viewing zones 12 also have their maximum width, from which the various views can be seen if the screen is operated in a conventional manner as multiperson screen. Of course, the described method for displaying image information of two stereoscopic half-images can be produced also without the just-portrayed spreading so that the stereoimage or the monoimage formed by one of the stereoscopic half-images, as illustrated in FIG. 6, can be seen in particular from the plane 15. In this case also, due to corresponding activation of the matrix screen 10 or due to corresponding apportioning of the image information to the subpixels 13, it must however be taken into account that a lateral spacing between the stereozone 17 and at least one of the two regions 16 is in any event smaller than the average eye spacing, preferably significantly smaller than 65 mm, in order that at least the first viewer 18 can perceive the stereoimage. The width k of the image channels, illustrated in FIG. 6, in the plane 15 which corresponds to the width of the viewing zones 12 and, in the case of the screen of the embodiment, is approximately as large as the average eye spacing of 65 mm, can also be significantly smaller in other embodiments. If K in contrast corresponds to the average eye spacing in order of magnitude, the activation for viewing from the plane 15 can be adapted in that for example the illustrated image channel 5 is not blanked but rather is filled also with image information of the first half-image so that both regions 16 extend up to the stereozone 17. A comparison with the situation of FIGS. 1 and 4 also shows how tracking of the first viewer 18 can be implemented not only in the lateral direction but also with a possible considerable change in the viewing distance.

The activation of the matrix screen 10, in the described method, is finally adjusted or changed also as a function of the head position or head movement of the first viewer 18 which is detected like the head position of the second viewer 19 with the device 24 such that the stereozone 17 and the two regions 16 situated next to this stereozone 17 are placed and tracked, during a head movement, such that precisely one of the eyes 20 of the viewer 18 is always situated in the stereozone 17 and precisely one of the eyes 20 of the viewer 18 in one of the regions 16 and also remains so during a change in head position. This takes place in that the groups 21 and 23 of subpixels 13 which form the image points of both half-images are stepped finely or are displaced laterally quasi continuously in that an intensity with which respectively a subpixel 13 situated at the edge of one of the groups 21 or 23 is activated is reduced, whilst a previously blanked subpixel 13 or one activated with reduced intensity is activated on an oppositely situated edge of the same group 21 or 23 with correspondingly higher intensity.

Figure 7:
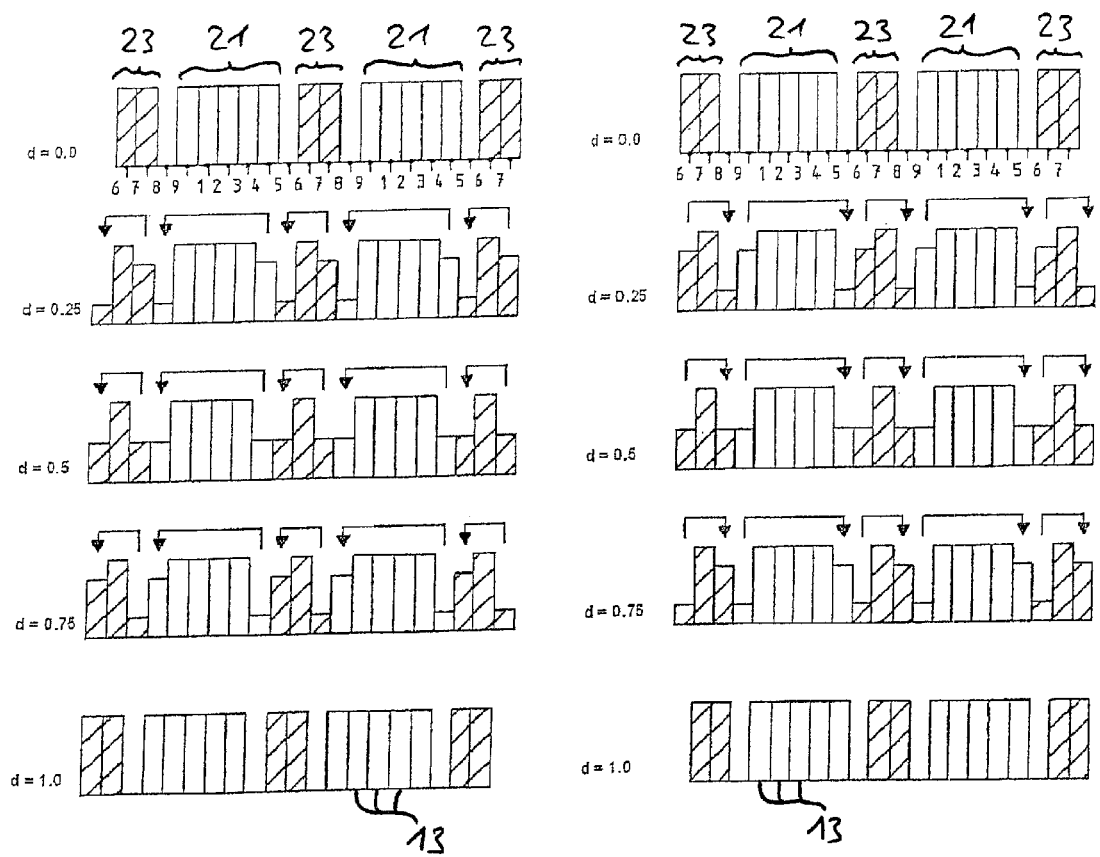
FIG. 7 shows, with reference to bar charts, how a lateral movement of the first viewer can be compensated for by changing writing-in of the image information.

It is illustrated in FIG. 7 how such reapportioning of intensities can be effected between subpixels 13 of the groups 21 and 23 and also respectively adjacent subpixels 13. Five images disposed amongst each other thereby show in the left half of FIG. 7 how the groups 21 and 23 and the consequently represented image points can be displaced to the left by a quantity d which corresponds to the spacing of two adjacent subpixels 13, while it is shown, in a corresponding manner, in the right half of FIG. 7 how the groups 21 and 23 can be displaced to the right by a corresponding quantity d and in fact respectively in four steps. The intensities or brightnesses with which the illustrated subpixels 13 from one line of the matrix screen 10 are activated, are displayed respectively as bar height in the bar chart-like illustration. The thus illustrated intensity or brightness values are of course multiplied by the color- and brightness value which is produced from the image information for the respective image point which is reproduced by the group 21 or 23. In an entirely similar manner, also the previously mentioned spreading of the image information can be organized in the lateral direction in that the image channels, relative to the subpixels 13 in each line from one to the other end of the line, receive in a similarly finely stepped manner individual subpixels 13 into the group 21 or 23, with which this group 21 or 23 and subsequently adjacent groups 21 or 23 begin to be displaced laterally.

By means of the described method which can be implemented with the screen from the embodiment, an undisturbed image viewing can be made possible for a comparatively large number of viewers, at least one of the viewers being able to see a stereoimage. The other viewers in fact see only a monoimage, however at least without disrupting effects, in particular so-called pseudo stereozones are avoided in which stereoscopic half-images which are complementary to each other are displayed transposed. Tracking of the viewers can be effected in an exceptionally finely stepped manner by means of the interlocking pattern just described with reference to FIG. 7. A desired viewing spacing which will normally be smaller than the nominal viewing distance between the plane 15 and the screen can be adjusted and maintained by displacement of the left and right image channels in opposite directions. In all cases, as large as possible a number of adjacent monochannels is occupied by the same image content.

As a result, there extend, to the right and left next to a tracked region from which the stereoimage can be perceived, wide monozones (the regions 16) in which persons standing around can perceive an undisturbed image. The continuous viewing region which is produced by the region around the stereozone 17 and by the lateral monozones is thereby greater than a region in which, with a conventional operation of the screen as multiperson screen, the stereoimages can be perceived (the just mentioned region is produced by the viewing zones 12 of FIG. 1). The result thereby for the central viewer 18 who perceives a stereoimage is a comfortable movement region because of the trackability of the stereozone 17 and the regions 16. Tracking is thereby not visible within the regions 16 (i.e. within the monozones) and therefore does not disturb the remaining viewers (in particular the viewer 19). Conversely, the first viewer 18 cannot notice it as disturbing when the activation of the screen is changed because of a movement of the second viewer 19.

The invention can be applied in entirely different fields, for example in endoscopic OP technology, for visual control of remote-controlled manipulator technology (for example grippers), for stereoscopic education and training systems, for 3D TV control monitors or multimedia 3D monitors for kiosk systems (for example in museums) or for computer games.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method for displaying image information on an autostereoscopic screen that is suitable for simultaneous display of a plurality of more than two views which are visible respectively from at least one of a plurality of laterally offset viewing zones, wherein the screen is configured as a matrix screen having a beam splitter grid, the method comprising:
reproducing a first stereoscopic half-image on the screen such that the first stereoscopic half-image is visible from two laterally offset and respectively continuous regions;
reproducing a second stereoscopic half-image on the screen such that the second stereoscopic half-image is visible from a stereozone that is disposed between the two laterally offset and respectively continuous regions and that is smaller than the two laterally offset and respectively continuous regions;
wherein the first stereoscopic half-image and the second stereoscopic half-image are simultaneously perceptible and together produce a stereoimage and wherein image points of the first stereoscopic half-image are reproduced respectively on a larger number of subpixels of the screen than image points of the second stereoscopic half image.

2. The method according to claim 1, wherein for each of a large number of lines of the matrix screen, groups of adjacent subpixels that are activated respectively in order to reproduce one of the image points of the first stereoscopic half-image alternate with directly adjacent subpixels or those separated therefrom by at least one blanked subpixel or with smaller groups of adjacent subpixels that are activated respectively in order to reproduce one of the image points of the second stereoscopic half-image.

3. The method according to claim 1, wherein the second stereoscopic half-image covers only a partial region of the matrix screen and the image points of the first half-image without this partial region are formed respectively by a greater number of subpixels than within the partial region.

4. The method according to claim 1, wherein the image information of the two half-images is written into the subpixels of the matrix screen, spread in the lateral direction, such that the two regions from which the first stereoscopic half-image is completely visible, and the stereozone from which the second half-image is completely visible have a maximum width in a viewing plane which is situated closer to the screen than a plane from which the plurality of more than two views is visible when the screen is operated as multiperson screen.

5. The method according to claim 1, further comprising:
detecting a head or eye position and/or head or eye movement of a first viewer; and
adjusting or changing activation of the screen as a function of the detected head or eye position or movement such that the stereozone from which the second stereoscopic half-image is visible and the two regions which are situated next to this stereozone and from which the first stereoscopic half-image is visible, are placed or tracked such that a first eye of the viewer comes to be situated or remains in one of the two mentioned regions while a second eye of the viewer comes to be situated or remains in the mentioned stereozone.

6. The method according to claim 1, further comprising:
detecting a head or eye position or movement of at least one second viewer; and
changing activation of the screen as a function of the detected head or eye position or movement such that the image information of the two stereoscopic half-images is transposed and, at the same time, the stereozone and the two mentioned regions are displaced laterally by an eye spacing if an eye of the second viewer is consequently prevented from leaving one of the two mentioned regions.

7. An autostereoscopic screen configured to simultaneous display a plurality of views which are visible respectively from at least one of a plurality of laterally offset viewing zones, the autostereoscopic screen comprising:
a matrix screen with a large number of subpixels;
a beam splitter grid configured to direct light emanating from the subpixels respectively into at least one of the plurality of laterally offset viewing zones; and
a control unit for activating the subpixels of the matrix screen as a function of image information of a first stereoscopic half-image and of a second stereoscopic half-image;
wherein the control unit is configured, in at least one possible operating mode, to apportion image information of the first stereoscopic half-image and the second stereoscopic half-image to the subpixels such that image points of the first stereoscopic half-image are reproduced on a larger number of subpixels than image points of the second stereoscopic half-image so that the first stereoscopic half-image is visible from two laterally offset and respectively continuous regions, while the second stereoscopic half-image is visible from a stereozone which is situated between the two mentioned regions and is smaller than each of these two laterally offset and respectively continuous regions.

8. The screen according to claim 7, wherein the control unit is designed to activate the matrix screen at least in the mentioned operating mode such that in each of a large number of lines of the matrix screen, groups of adjacent subpixels that reproduce respectively one of the image points of the first stereoscopic half-image alternate with directly adjacent subpixels or those separated therefrom by at least one blanked subpixel or with smaller groups of adjacent subpixels which reproduce respectively one of the image points of the second stereoscopic half-image.

9. The screen according to claim 7, wherein the matrix screen is a liquid crystal screen.

10. The screen according to claim 7, wherein the beam splitter grid is one of a slot grid, a stepped grid, a perforated grid, a cylinder lens grid or a spherical lens grid.

11. The screen according to claim 7, wherein the control unit is designed to write the image information of the two half-images in the mentioned operating mode into the subpixels of the matrix screen, spread in the lateral direction, such that the two regions from which the first stereoscopic half-image is completely visible, and the stereozone from which the second half-image is completely visible have a maximum width in a viewing plane which is situated closer to the screen than a plane from which, in another operating mode in which the screen forms a multiperson screen, the plurality of more than two views is visible.

12. The screen according to claim 11, wherein the matrix screen can be actuated in the mentioned other operating mode such that the subpixels are apportioned in each line cyclically to a number of image channels corresponding to the number of more than two views, while the subpixels in the first-mentioned operating mode are apportioned to the two half-images such that an average spacing between area center points of the adjacent image points of the first half-image, formed respectively from a plurality of subpixels, and an average spacing between area center points of the adjacent image points of the second half-image, formed likewise respectively from a plurality of subpixels, deviate respectively from an integral multiple of a spacing between adjacent subpixels.

13. The screen according to claim 7, further comprising a device for detecting a head position of a first viewer, wherein the control unit is configured to activate the matrix screen as a function of the detected head position or movement such that the stereozone from which the second stereoscopic half-image is visible and the two regions which are situated next to this stereozone and from which the first stereoscopic half-image is visible are placed or tracked during a change in the head position such that a first eye of the viewer comes to be situated or remains in one of the two regions and a second eye of the viewer comes to be situated or remains in the stereozone.

14. The screen according to claim 13, wherein the device for detecting a head position of the first viewer is configured to also detect a head position of a second viewer, and wherein the control unit is configured to change activation of the matrix screen as a function of the detected head position of the second viewer such that the image information of the two stereoscopic half-images is transposed and at the same time the stereozone and the two regions are displaced laterally by an eye spacing if an eye of the second viewer is consequently prevented from leaving one of the two mentioned regions.

* * * * *

UNITED STATES PATENT AND TRADEMARK OFFICE
CERTIFICATE OF CORRECTION

PATENT NO. : 8,633,972 B2
APPLICATION NO. : 13/037911
DATED : January 21, 2014
INVENTOR(S) : René de la Barré et al.

It is certified that error appears in the above-identified patent and that said Letters Patent is hereby corrected as shown below:

On the Title Page:

Item (73), replace "Fraunhofer-Geselschaft zur Foerderung der angewandten Forschung e.V." with --Fraunhofer-Gesellschaft zur Foerderung der angewandten Forschung e.V.--

Signed and Sealed this
First Day of July, 2014

Michelle K. Lee
*Deputy Director of the United States Patent and Trademark Office*